(12) United States Patent
Hulse (10) Patent No.: US 9,016,961 B2
(45) Date of Patent: Apr. 28, 2015

(54) SHOE CAMERA MOUNT (71) Applicant: Tim Hulse, Southampton (BM)

(72) Inventor: Tim Hulse, Southampton (BM)

( * ) Notice: Subject to any disclaimer, the term of this patent is extended or adjusted under 35 U.S.C. 154(b) by 0 days.

(21) Appl. No.: 14/261,034

(22) Filed: Apr. 24, 2014

(65) Prior Publication Data

US 2014/0321843 A1 Oct. 30, 2014

Related U.S. Application Data (60) Provisional application No. 61/815,534, filed on Apr. 24, 2013, provisional application No. 61/871,536, filed on Aug. 29, 2013.

(51) Int. Cl.
*G03B 17/00* (2006.01)
*G03B 17/56* (2006.01)

(52) U.S. Cl.
CPC ................... *G03B 17/561* (2013.01)

(58) Field of Classification Search
USPC .......... 396/419, 427–429; 348/373, 374, 376; 33/2 R, 3 R; 248/187.1
See application file for complete search history.

(56) References Cited

U.S. PATENT DOCUMENTS

| | | | |
|---|---|---|---|
| 2,771,014 A | 11/1956 | Tolcher | |
| 3,704,848 A | 12/1972 | Trebes | |
| D240,094 S | 6/1976 | Linn | |
| 4,279,433 A | 7/1981 | Petaja | |
| 4,727,390 A | 2/1988 | Brown | |
| 4,733,259 A * | 3/1988 | Ng | 396/419 |
| D302,697 S | 8/1989 | Parrish | |
| D307,286 S | 4/1990 | Ginder | |
| 5,027,141 A | 6/1991 | Bowers | |
| 5,173,725 A | 12/1992 | Giles | |
| D349,716 S | 8/1994 | O'Farrill | |
| 5,350,147 A | 9/1994 | Paganus | |
| 6,292,213 B1 | 9/2001 | Jones | |
| 6,764,231 B1 | 7/2004 | Shubert | |
| D500,511 S | 1/2005 | Sybilrud | |
| 7,066,664 B1 | 6/2006 | Sitoh | |
| D525,998 S | 8/2006 | Bradley et al. | |
| 7,273,321 B2 | 9/2007 | Woodman | |
| 7,380,996 B2 | 6/2008 | Kouchi | |
| 7,390,130 B2 | 6/2008 | Soulvie | |
| D574,878 S | 8/2008 | DeSorbo | |
| 7,422,379 B2 | 9/2008 | Agevik | |
| 7,458,736 B2 | 12/2008 | Woodman | |
| 7,576,800 B2 | 8/2009 | Swain | |
| 7,624,955 B2 | 12/2009 | McGill | |
| 7,789,574 B2 | 9/2010 | Broberg | |
| D626,165 S | 10/2010 | Raken | |
| 7,965,337 B2 | 6/2011 | Holmberg | |
| D647,946 S | 11/2011 | Raken | |

(Continued)

*Primary Examiner* — WB Perkey
*Assistant Examiner* — Minh Phan
(74) *Attorney, Agent, or Firm* — Mark R. Malek; Widerman Malek, PL (57) ABSTRACT

A camera mount may include a base which may have a bottom portion and a top portion, a pair of opposing sidewalls that may be connected to and may extend upwardly from the base, and a platform that may be attached to the base. The platform may include a platform base, a connector member that may be connected to and may extend upwardly from a medial portion of the platform base, and a pair of opposing mounting walls that may be connected to and may extend upwardly from side portions of the platform base. The base may be adapted to be connected to a portion of footwear and the platform may be adapted to slidably engage a portion of a camera to retain the camera therein.

19 Claims, 5 Drawing Sheets

(56) References Cited

U.S. PATENT DOCUMENTS

| | | |
|---|---|---|
| 8,065,994 B2 | 11/2011 | Holmberg |
| 8,079,501 B2 | 12/2011 | Woodman |
| 8,150,248 B1 | 4/2012 | Woodman |
| 8,161,674 B2 | 4/2012 | Holmberg |
| D663,190 S | 7/2012 | Mota |
| 8,325,235 B1 | 12/2012 | Tan |
| 8,342,758 B2 | 1/2013 | Braithwaite |
| D678,380 S | 3/2013 | Pardo |
| 8,465,216 B2 | 6/2013 | Justice |
| 8,477,240 B2 | 7/2013 | Kang |
| 8,612,181 B2 | 12/2013 | Czaja |
| 8,656,625 B2 | 2/2014 | Holmberg |
| 2003/0044180 A1 | 3/2003 | Lindberg |
| 2006/0066753 A1* | 3/2006 | Gennetten et al. ............ 348/375 |
| 2007/0160364 A1 | 7/2007 | Peika |
| 2007/0166024 A1 | 7/2007 | Robinson |
| 2007/0201861 A1 | 8/2007 | Coulman |
| 2008/0187308 A1 | 8/2008 | Hannan |
| 2010/0259619 A1 | 10/2010 | Nicholson |
| 2012/0020656 A1 | 1/2012 | Farmer |
| 2013/0004153 A1 | 1/2013 | McKee |
| 2014/0105589 A1* | 4/2014 | Samuels ...................... 396/421 |

* cited by examiner

SHOE CAMERA MOUNT

RELATED APPLICATIONS

This application claims the benefit under 35 U.S.C. §119 (e) of U.S. Provisional Patent Application Ser. No. 61/815,534 filed on Apr. 24, 2013 and titled CAMERA MOUNT ASSEMBLY and U.S. Provisional Patent Application Ser. No. 61/871,536 filed on Aug. 29, 2013 and titled SHOE CAMERA MOUNT, the entire contents of which are incorporated herein by reference.

FIELD OF THE INVENTION

The present invention relates to the field of camera mounts and, more specifically, to camera mounts that allow for a camera to be mounted onto the footwear of a user.

BACKGROUND OF THE INVENTION

Cameras have become an ever present device in our everyday lives. Many people use cameras to regularly take pictures and record video clips to preserve memories of past events. To use the camera, typically, a user will hold the camera while manipulating the camera's functions or, the user may opt to use a tripod.

When a user is filming a sports event, it is sometimes difficult to get certain camera angles that keep the viewer's attention with respect to the ongoing action. However, allowing a camera operator to get too close to the field or court may create a hazard, as there is a potential for injury to the camera operator and/or the player (or participant in the activity). Additionally, having a non-participant on the field of play recording live action may hamper the game's proceedings.

Numerous solutions exist for enabling a camera to be located in a best position for an optimal camera angle such as, for example, cameras may be mounted on tripods, monopods, and various types of frame assemblies. Tripods can stabilize the camera movement but restrict portability. Frame assemblies for mounting cameras on the human body for stabilization are typically not designed for the size, weight and ergonomics of the small, palm-sized handheld digital cameras of today.

However, the "best" shot is sometimes simply not available. The camera with the best angle may be too far from the field of play, or spectators might obstruct the camera's view of the field of play. Additionally, the camera angle may also be obstructed by players standing along the sideline, or by physical objects. Additionally, a camera that is mounted to a platform may not be able to follow the action. Even if the camera is portable, it is typically not in a position to adequately record many aspects of a live event. Helmet mounted cameras have been utilized to provide a unique perspective for filming but a need still exists for even additional angles to further enhance a viewer's attention.

Accordingly, there is a need to improve on the capturing of real-time video or still images of various types of sporting events.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the foregoing in mind, the present invention is related to a camera mount to mount a camera to footwear, a shoe, a boot, or other foot worn apparel. The camera mount advantageously allows for a camera to be readily mounted in a simple fashion, and is uncomplicated to use.

The camera mount according to an embodiment of the present invention may have a base which may have a bottom portion and a top portion, a pair of opposing sidewalls which may be connected to and may extend upwardly from the base, and a platform which may be attached to the base. The base may include a platform base, a connector member which may be connected to and may extend upwardly from a medial portion of the platform base, and a pair of opposing mounting walls which may be connected to and may extend upwardly from side portions of the platform base. The base may be adapted to be connected to a portion of footwear. The platform may be adapted to slidably engage a portion of a camera to retain the camera therein.

The bottom portion of the base may be curved, substantially curved, flat, or substantially flat and the top portion of the base may be curved, substantially curved, flat, or substantially flat. The platform may have a length that is longer than a width of the base. Each of the opposing mounting walls may be defined by a vertically extending wall that may extend upwardly from the platform base and a generally horizontally extending wall that may extend inwardly from a top portion of the vertically extending wall. The pair of opposing mounting walls and the connector member may extend generally parallel to one another.

In some embodiments, the camera mount may further include an intermediate member that may extend upwardly from the base. The platform may be connected to the intermediate member so that the platform is elevated from the base. Accordingly, in this embodiment, connection between the platform and the base is accomplished using the intermediate member. The intermediate member may be detachably connected to the base. The platform base, the connector member and the pair of opposing mounting walls may be integrally formed as a monolithic unit.

The camera mount may further include a locking member formed on one of the opposing sidewalls. The locking member may have a substantially arcuate shape which may extend upwardly from an upper portion of the sidewall. The locking member may further include a locking member opening formed through a medial portion thereof.

The connector member may be provided by a pair of connector members and a passageway may be formed in the medial portion of the platform base between the pair of connector members. The passageway may be threaded. The base may comprise a flexible material and may be extendable and collapsible in a longitudinal direction.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
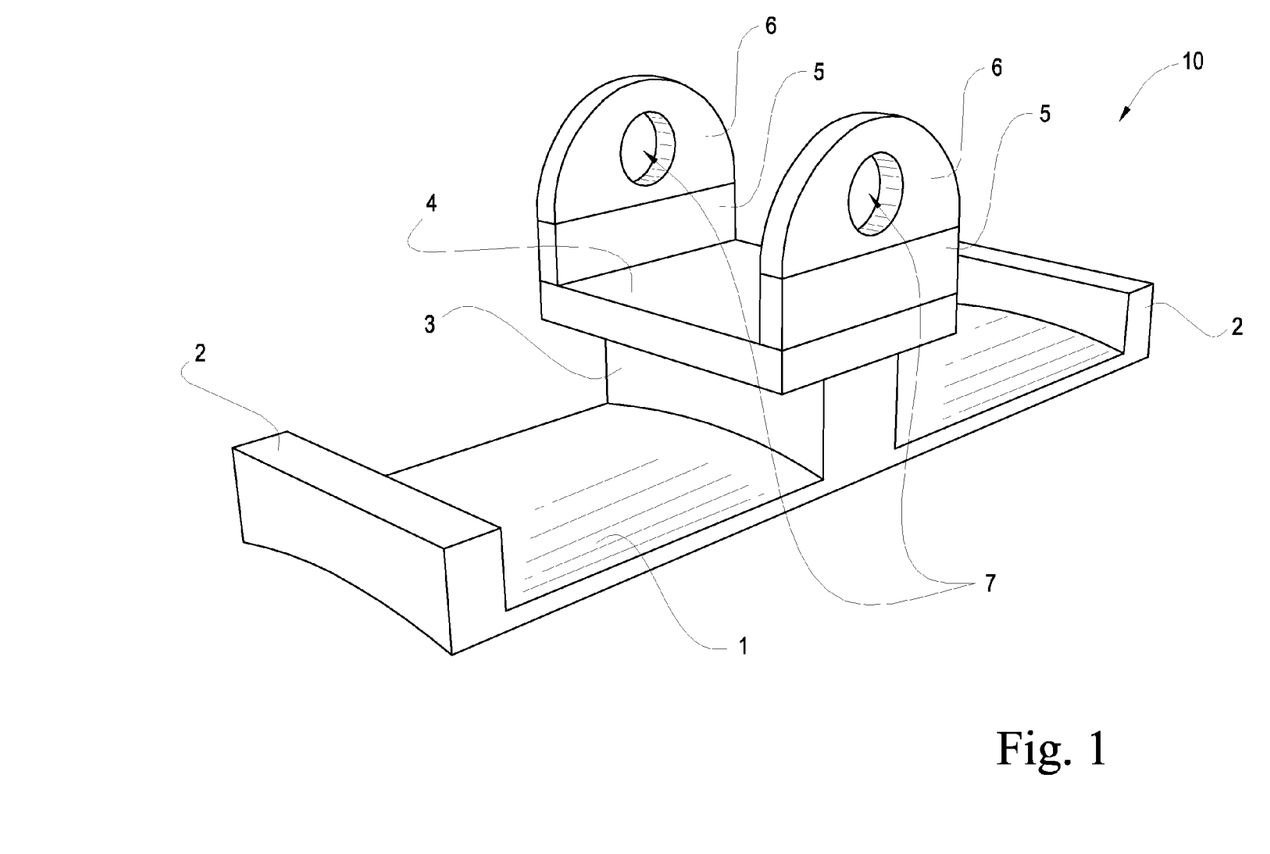
FIG. 1 is a perspective view of a camera mount according to an embodiment of the present invention.

Referring now to FIG. 1, a first embodiment of a camera mount 10 will now be discussed. As shown in FIG. 1, the camera mount 10 may have a base 1 that may be rectangular shaped, a pair of opposing sidewalls 2, and an intermediate member 3. The pair of opposing sidewalls 2 may extend from opposite sides of the base 1 and extend upwardly. As illustrated in FIG. 1, the base 1 may be curved. The curvature of the base 1 may vary, but those skilled in the art will appreciate that the curvature of the base advantageously may conform to a curvature of a top of a shoe for enhanced stability. The base may include a top portion and a bottom portion. More particularly, the crest of the curve of the base 1 is intended to be along a longitudinal axis of the base 1 so that the base 1 curves downwardly to end portions thereof. Further, those skilled in the art will appreciate that, although the top portion of the base 1 is illustrated as having a curved top, the base 1 may, in some instances, be provided with a top portion that is curved, substantially curved, flat, or substantially flat, and the bottom portion may be curved, substantially curved, flat, or substantially flat. The top portion and the bottom portion may have substantially similar curvatures. This may provide ease of manufacture which may, in turn, result in decreased manufacturing costs.

Those skilled in the art will further appreciate that the curvature of the base 1 may vary depending on the type of footwear that the camera mount 10 of the present invention is designed to be connected to. For example, the camera mount 10 may be specifically designed for a ski boot, a snow board shoe, a motorcycle boot, a foot, a prosthetic limb, or any other implementation of foot wear. In such cases, a different curvature of the base 1 may be desirous. Additionally, the curvature of the base 1 may be modified to provide an ergonomic fit. The various curvatures of the base 1 of the camera mount 10 according to embodiments of the present invention are meant to be included as a part of the invention.

A skilled artisan will also appreciate that the base 1 may be manufactured from a material that enables the camera mount 10 to curve or flex to the curvature of the footwear to which the mount 10 is attached. Alternatively, the base 1 may be formed in sections so as to provide a natural flexibility thereto. For example, the sections may be hingedly connected to one another so as to provide various pivot points to allow for flexibility. Those skilled in the art will appreciate that, although not illustrated in the appended drawings, various structural features may be included in the base 1 to provide for flexibility thereto.

The pair of opposing sidewalls 2 may each have a rectangular shape that extends upwardly from a top portion of the base 1. A skilled artisan will appreciate that the pair of opposing sidewalls 2 may alternatively have a generally arcuate shape. A skilled artisan will further appreciate that each of the opposing sidewalls 2 may have a bottom portion and an upper portion. The bottom portion of each of the opposing sidewalls 2 may be curved, substantially curved, flat, or substantially flat. The upper portion of each of the opposing sidewalls may be curved, substantially curved, flat, or substantially flat. Although it is preferable that the pair of opposing sidewalls 2 and the base be integrally molded as a monolithic unit, those skilled in the art will appreciate that the pair of opposing sidewalls 2 may also be detachably connected to the base 1. Additionally, the pair of opposing sidewalls 2 may be connected to the base in such a manner that they may be pulled to extend the base 1 in a longitudinal direction. Accordingly, the present invention contemplates that the base 1 may be longitudinally expandable (or extendable) and collapsible. This advantageously allows for the base 1 of the camera mount 10 to be readily adapted for connection to various sized foot worn apparel. The camera mount 10 may also be manufactured without the pair of opposing sidewalls 2.

An intermediate member 3 may be carried by the base 1 adjacent to a medial portion thereof. The intermediate member 3 may extend upwardly from the base 1 in a direction similar to the pair of opposing sidewalls 2, and may include a platform 4 which may have a polygonal shape. The platform 4 illustratively has a surface area that is larger than a surface area of a top portion of the intermediate member 3. The intermediate member 3 may be a rectangular extension from the base 1. In other words, when viewed in cross-section, the intermediate member 3 may have a rectangular shape. However, a skilled artisan will appreciate that the shape of the intermediate member 3 may be modified without departing from the scope of the invention. For example and without limitation, the intermediate member 3 may have a cross-sectional shape in the shape of a cylinder. As additional examples and without limitation, the intermediate member 3 may have a cross-sectional shape that is triangular, generally triangular, square, generally square, rectangular, generally rectangular, circular, generally circular, semi-circular, generally semi-circular, elliptical, generally elliptical, polygonal, and/or generally polygonal. A skilled artisan will also appreciate that the shape of the platform 4 may be a shape other than square. For example and without limitation, the platform 4 may be triangular, generally triangular, square, generally square, rectangular, generally rectangular, circular, generally circular, semi-circular, generally semi-circular, elliptical, generally elliptical, polygonal, and/or generally polygonal.

A skilled artisan will also appreciate that the position of the intermediate member 3 may be modifiable by a user. For example, the intermediate member 3 may be slidably connected to the base 1. A slidable connection may enable the intermediate member 3 to slide along the length of the base 1. Manipulating the position of the intermediate member 3 may serve to improve or alter the ergonomic fit of the camera mount 10 and provide an ability of the user to change the angle of recording for the camera mount 10. In an embodiment of the invention where the intermediate member 3 is slidably connected to the base 1, a track may be formed in the base 1 to receive a bottom portion of the intermediate member 3. Further, although not illustrated in the appended drawings, the intermediate member 3 may include locking portions that interconnect with portions of the track formed on the base 1 to allow the intermediate member 3 to be moved between an unlocked position and a locked position. When in the unlocked position, the intermediate member 3 may be allowed to readily longitudinally slide along the base 1. Conversely, when in the locked position, the intermediate member 3 may be fixed longitudinally along the base 1. Accordingly, it is contemplated that the track formed in the base 1 may have a plurality of locking positions to allow the intermediate member 3 to be slidably moved to various longitudinal positions along the base 1.

The platform 4 may be located at the top of intermediate member 3. The platform 4 may be formed in the shape of a square. A skilled artisan would appreciate that the platform 4 may be formed in any shape without departing from the scope of the invention, such as but not limited to a square, a circle, a semi-circle, a hexagon, an octagon, a polygon, etc.

The platform 4 may also include a pair of opposing mounting walls 8. The pair of opposing mounting walls 8 may each include a lower portion 5 and an upper portion 6. Each lower portion 5 may be rectangular shaped and each upper portion 6 may have a generally arcuate shape. A skilled artisan will appreciate that the shape of the pair of opposing mounting walls 8 may be modified without departing from the scope of the invention. Further, the mounting walls may be integrally formed as a monolithic unit, i.e., the lower portion 5 and the upper portion 6 may be one monolithic unit. Those skilled in the art will also appreciate that the platform 4 and the pair of opposing mounting walls 8 may also be integrally formed as a monolithic unit. Those skilled in the art will still further appreciate that the intermediate member 3, the platform 4, and the pair of opposing mounting walls 8 may all be integrally formed as a monolithic unit. In an alternative embodiment, the pair of opposing mounting walls 8 may consist of a rectangular pillar with an opening that may be located in the medial portion of the pillar.

Each upper portion 6 may also include an opening 7. Each opening 7 in the upper portion 6 may be formed collinearly with respect to the other (opening 7) and may lie substantially in the center of the upper portion 6. The opening 7 illustrated in FIG. 1, although circular may be modified by a person of ordinary skill in the art. A skilled artisan may appreciate that the opening 7 may be formed as, but not limited to, a square or hexagon or a non-circular shape. In another embodiment, the opening 7 may be threaded. An alternative embodiment may include a plurality of upper portions 6 with a partially blocked opening where the opening does not go through the upper portion 6 entirely. A mechanism may fit into the opening 7 and press against the blocked portion of the opening 7.

The openings 7 in the pair of opposing mounting walls 8 are intended to receive a bolt or bar for securing a camera to the camera mount 10. A user may mount a camera by threading a bar through an opening at the bottom of a camera or a case enclosing the camera and the openings 7 of the pair of opposing mounting walls 8. The bar may be secured in place by using a nut or an equivalent locking mechanism that prevents the bar from becoming uncoupled from the camera mount 10. The locking mechanism is also designed to prevent the bar from rotating in its position so that the camera position is stable.

A skilled artisan would appreciate that in another embodiment, the bar may be secured in the openings 7 by a mechanism that allows the bar to rotate through a series of locking positions. Therefore, once the bar is secured to the pair of opposing mounting walls 8, the bar may cooperate with a locking mechanism to allow the camera to rotate to one of a plurality of locking positions with respect to the platform 4 of the camera mount 10. Enabling the camera to easily transition into an upright position of various angles with respect to the platform 4 would allow a user to optimize the camera angle without uncoupling the camera from the camera mount 10.

Figure 2:
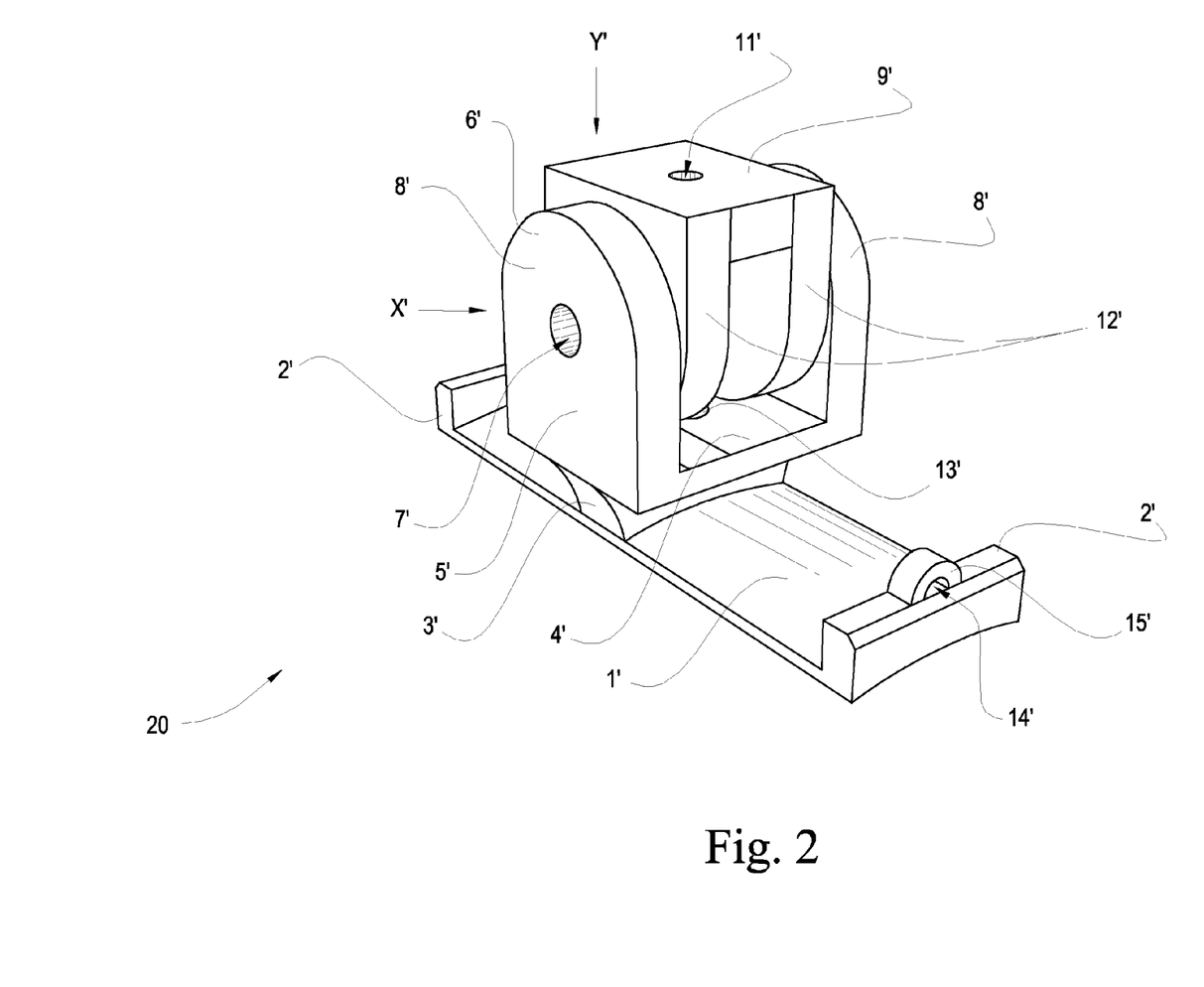
FIG. 2 is a perspective view of a camera mount according to another embodiment of the present invention.

Referring now to FIG. 2, the elements of the camera mount 20 are labeled with a prime notation that relate to the elements of FIG. 1. The elements that are not different from those of FIG. 1 require no further discussion. More specifically, this embodiment of the camera mount 20 includes the base 1', the pair of opposing sidewalls 2' and the intermediate member 3'. The base 1', the pair of opposing sidewalls 2' and the intermediate member 3' are somewhat similarly situated to the first embodiment of the camera mount 10. The intermediate member 3' is illustratively shaped somewhat differently from the intermediate member 3 of the first embodiment of the camera 10. More specifically, the intermediate member 3' of the camera mount 20, according to the present invention, may taper upwardly from a narrow base to a wider base. This advantageously enhances stability of the camera mount 20 according to this embodiment of the present invention.

This embodiment of the camera mount 20 according to the present invention includes a primary member X' and a secondary member Y'. The primary member X' includes the platform 4', the pair of opposing mounting walls 8' that extend upwardly from the platform 4', and a passageway 13'. The passageway 13' may otherwise be known as an aperture. The passageway 13' may be circular and may be in the center of the platform 4'. A skilled artisan would appreciate that the passageway 13' may include a non-circular shape without departing from the scope of the invention. Additionally, the passageway 13' may also be threaded. The pair of opposing mounting walls 8' of this embodiment of the camera mount 20 may be formed with the platform 4' as a monolithic unit to be a rectangular extension from the platform 4' with a generally arcuate shape at the top of the rectangular extension. The pair of opposing mounting walls 8' may extend from opposite sides of the platform 4'.

The secondary member Y' of the camera mount 20 according to this embodiment of the present invention may be designed to fit within the pair of opposing mounting walls 8' of the primary member X'. The secondary member Y' may include a pair of connecting mounting walls 12', a second platform 9' and an aperture 11'. The secondary member Y' may also be detachably connected to the primary member X'. The second platform 9' may be similar to the platform 4' in terms of shape and function. The pair of connecting mounting walls 12' may extend from opposing sides of the second platform 9' and may include a rectangular extension with a top consisting of a general arcuate shape. Each connecting mounting wall 12' may also include an opening (not shown). The pair of openings in the pair of connecting mounting walls 12' may be formed collinearly with respect to each other. The openings of the pair of connecting mounting walls 12' may lie generally in the center of each connecting mounting wall 12'. The openings of the pair of connecting mounting walls 12' may also be threaded. The secondary member Y' may be designed so that when the secondary member Y' is inserted into the primary member X', the openings 7' of the primary member may lay collinearly with respect to the openings in the pair of connecting mounting walls 12'.

The camera mount 20 may further include a locking member 15' which may be formed on at least one of the opposing sidewalls 2' and a locking member opening 14' which may be formed through a medial portion of the locking member 15'. The locking member 15' may have a substantially arcuate shape which may extend upwardly from an upper portion of the at least one opposing sidewall 2'. A skilled artisan would appreciate that a nut and bolt locking mechanism or a functional equivalent may be utilized to secure a camera to the camera mount 20 by attaching a camera to the second platform 9' via a screw, bolt, pin, or other device and securing the secondary member Y' to the pair of opposing mounting walls 8' of the primary member X' by using the nut and bolt or other devices.

Operation of the camera mount 20 according to this embodiment of the present invention will now be described in greater detail. More specifically, the secondary member Y' may be pivotally connected to the primary member X' so that the openings 7' formed in the primary member are aligned with the openings formed in the pair of connecting mounting walls 12' of the secondary member. It is contemplated that the secondary member Y' may include locking mechanisms formed in the pair of connecting mounting walls 12' thereof that may matingly connect to the openings 7' formed in the primary member X'. It is also contemplated that a pivoting lock member (not shown) such as a bar, for example, may be passed through the openings 7' formed in the pair of opposing mounting walls 8' of the primary member X' and through the openings in the pair of connecting mounting walls 12' of the secondary member Y' so as to allow for the secondary member Y' to pivot with respect to the primary member X'. This advantageously allows for various angles to be achieved of a camera mounted to the second platform 9' of the secondary member Y'. Those skilled in the art will appreciate that the passageway 13' of the primary member X' may advantageously be situated to allow for the primary member X' to be rotatably connected to the intermediate member 3' so that camera angles and directions of view may also advantageously be enhanced.

Figure 3:
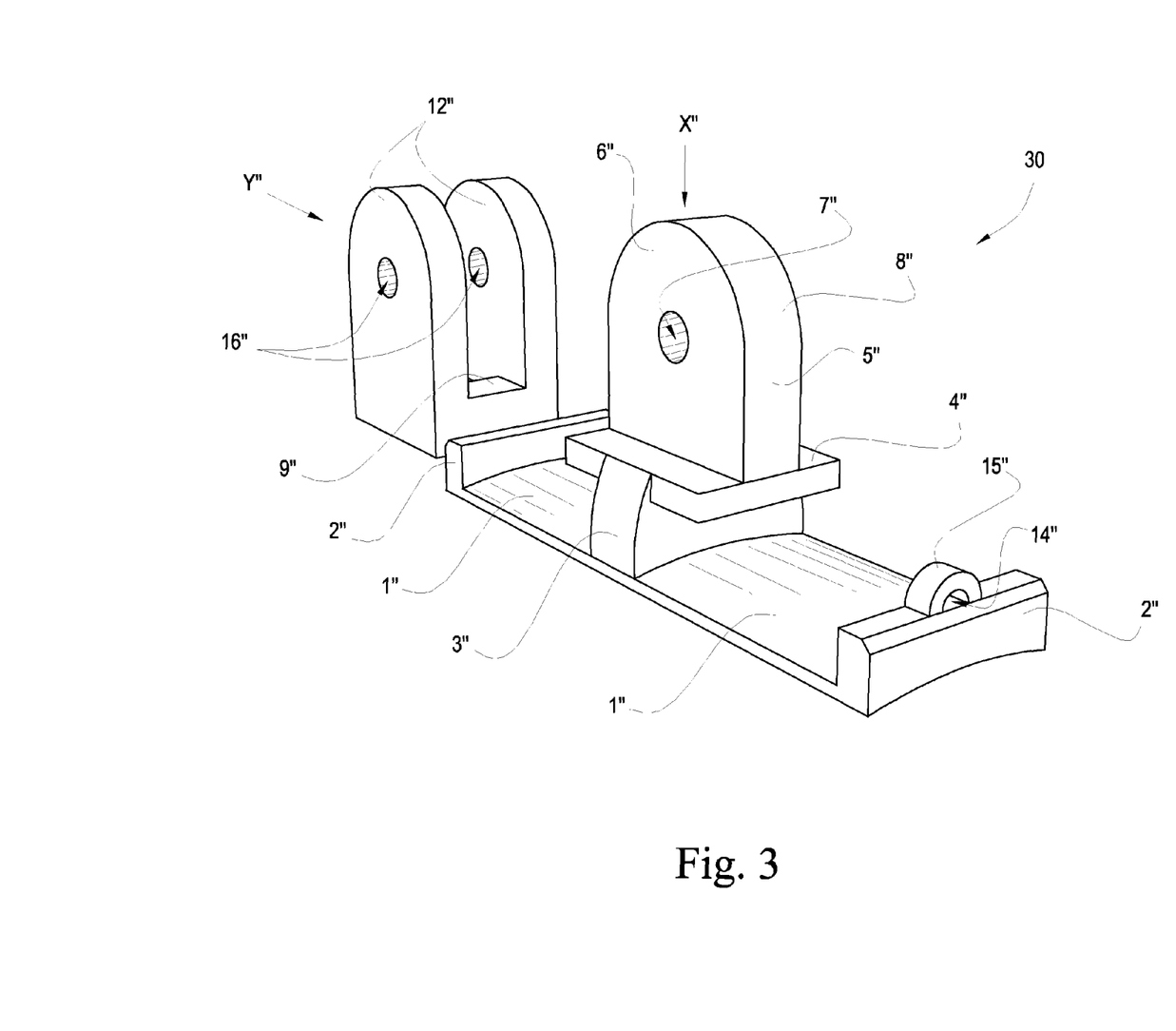
FIG. 3 is a perspective view of a camera mount according to yet another embodiment of the present invention.

Referring now to FIG. 3, the elements of the camera mount 30 are labeled with a double prime notation that relate to the elements of the camera mount 10, 20 as illustrated in FIGS. 1 and 2 respectively. More specifically, the camera mount 30 according to this embodiment of the present invention includes the base 1", the pair of opposing sidewalls 2" and the intermediate member 3" connected to a medial portion of the base 1". As illustrated in FIG. 3, the intermediate member 3" may be shaped so as to taper in a manner wherein a lower portion thereof is wider than an upper portion thereof. Those skilled in the art will appreciate that the shape of the intermediate member 3" may be any other shape, and that the illustrated shape is merely one option for achieving the objects, features, advantages and goals of the camera mount 30 according to this embodiment of the present invention.

Similar to the camera mount 20, the camera mount 30 may include a primary member X" and a secondary member Y" that cooperates with the primary member X" to allow for the secondary member Y" to be pivotally connected to the primary member X". Accordingly, a camera that is mounted to the secondary member Y" may advantageously be connected to achieve enhanced camera angles. The primary member X" may include the platform 4" and at least one of the opposing mounting walls 8". Each opposing mounting wall 8" may include the opening 7". Each opposing mounting wall 8" may extend from the medial portion of the platform 4". In an alternative embodiment of the invention, each opposing mounting wall 8" may extend from an edge of the platform 4". The secondary member Y" of the camera mount 30 according to this embodiment of the invention may include the second platform 9" and the pair of connecting mounting walls 12" extending from the second platform 9". Each connecting mounting wall 12" may include a second opening 16". The secondary member Y" may be designed so that it may be attached to each opposing mounting wall 8". Each second opening 16" of each connecting mounting wall 12" may be collinearly aligned to the opening 7" of each opposing mounting wall 8". Accordingly, the secondary member Y" may be pivotally connected to the primary member X" by engaging a member, such as a bar, to extend through the second openings 16" formed in the secondary member Y" and the opening 7" formed in the primary member X". Any of the elements of this embodiment of the camera mount 30 according to the present invention that have not been specifically discussed are similar to those of the previous embodiment of the camera mount 10, 20, are labeled with double prime notation, and require no further discussion herein.

Figure 4:
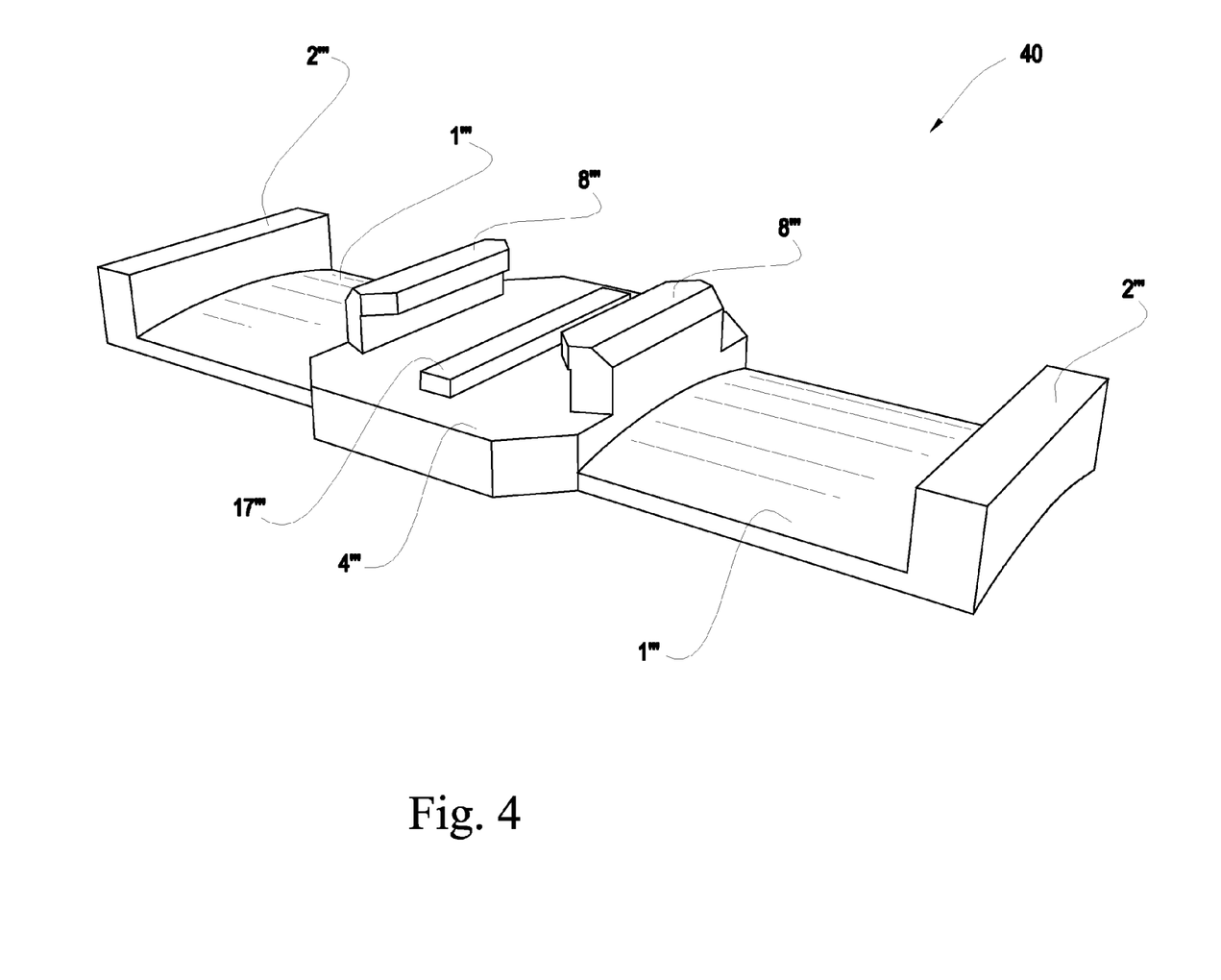
FIG. 4 is a perspective view of a camera mount according to still another embodiment of the present invention.

Referring now to FIG. 4, the elements of the camera mount 40 are labeled with a triple prime notation that relate to the elements of the camera mount 10, 20, 30 illustrated in FIGS. 1, 2 and 3, respectively. This embodiment of the camera mount 40 may include the base 1''' and the pair of opposing sidewalls 2''' which may be connected to and extend upwardly from the base 1'''. The base 1''' may include the bottom portion and the top portion and the platform 4''' which may be attached to the base 1''' and may extend upwardly from the medial portion of the base 1'''. Similar to the base 1 of the first embodiment of the camera mount 10 described above, this embodiment of the base 1''' may have a curvature associated therewith. The platform 4''' may include a platform base, a connector member 17''' and a pair of opposing mounting walls 8'''. The platform 4''' may be in the shape of an octagon but skilled artisans will appreciate that the shape of the platform 4''' may be modified or changed without departing from the scope of the invention. For example and without limitation, the platform 4''' may have a length that is longer than a width of the base 1'''. The platform 4''' may be formed so that a horizontal surface of the platform 4''' is higher than the horizontal surface of the base 1'''.

A skilled artisan will appreciate that the platform 4''' may be formed so that the horizontal surface of the platform 4''' and the horizontal surface of the base 1''' create a continuous flat surface. The platform 4''' may also be formed so that the horizontal surface of the platform 4''' may be lower than the horizontal surface of the base 1'''. The pair of opposing sidewalls 2''' may be shaped as inverted L-shaped panels that face each other. For example and without limitation, the bottom portion of each of the opposing sidewalls 2''' may be curved and the upper portion of each of the opposing sidewalls 2''' may be flat. The upper portion of each of the opposing sidewalls 2''' may extend generally horizontally inward from the upper portion of each of the opposing sidewalls 2'''. The connector member 17''' may be rectangular shaped and may be otherwise known as a rectangular section. The connector member 17''' may be arranged to lay parallel to the pair of opposing sidewalls 2'''. The connector member 17''' may be positioned generally in the center of the platform 4''' and may be connected to and may extend upwardly from a medial portion of the platform base.

The bottom portion of the base 1''' may be curved, substantially curved, flat and substantially flat. The top portion of the base 1''' may be curved, substantially curved, flat and/or substantially flat.

The pair of opposing mounting walls 8''' may be connected to and may extend upwardly from side portions of the platform 4''' and be oriented parallel, or substantially parallel, to the connector member 17'''. The term "substantially parallel" is meant to include angles of orientation of the pair of opposing mounting walls 8''' that are nearly parallel, i.e., within an angle of 20 degrees from parallel with respect to the connector member 17''' of the platform 4'''. Each opposing mounting wall 8''' may be defined by a vertically extending wall that extends upwardly from the platform base and a generally horizontally extending wall that extends inwardly from a top portion of the vertically extending wall.

Those skilled in the art will appreciate that the platform 4''', the platform base, the pair of opposing mounting walls 8''', and the connector member 17''', or any combination thereof, may be integrally formed as a monolithic unit. Those skilled in the art will also appreciate that the entire camera mount 40 of this embodiment of the present invention may be integrally formed as a monolithic unit, i.e., the base 1''', the pair of opposing sidewalls 2''', the platform 4''', the pair of opposing mounting walls 8''', and the connector member 17''' may be integrally formed as a monolithic unit. Those skilled in the art will appreciate that all of these elements and any other elements of the camera mount 40 may be integrally formed as a monolithic unit and may also be separately formed and connected to one another by any known means.

Operation of this embodiment of the camera mount 40 according to the present invention is now described in greater detail. The pair of opposing mounting walls 8''' of the platform 4''' may form a track. More particularly, and as illustrated in FIG. 4, each of the pair of opposing mounting walls 8''' may be provided by an inverted L-shaped structure that extends upwardly from the platform 4'''. Accordingly, the camera may be mounted so that the top of the inverted L-shaped structure secures the camera in place. Further, the connector member 17''' (which may be considered a male section) may advantageously interconnect with a female section of another mount to secure in place the camera. Accordingly, such a configuration allows for simplistic slidable connection of a camera connected to a mount, or to a camera itself so that the camera can be readily connected to the camera mount 40 according to this embodiment of the present invention. More specifically, the platform 4''' may be adapted to slidably engage a portion of a camera to retain the camera therein. The reference numbers that are specifically mentioned herein are labeled with triple prime notation and are related to those elements of the first embodiment of the camera mount 10, and require no further discussion herein.

Figure 5:
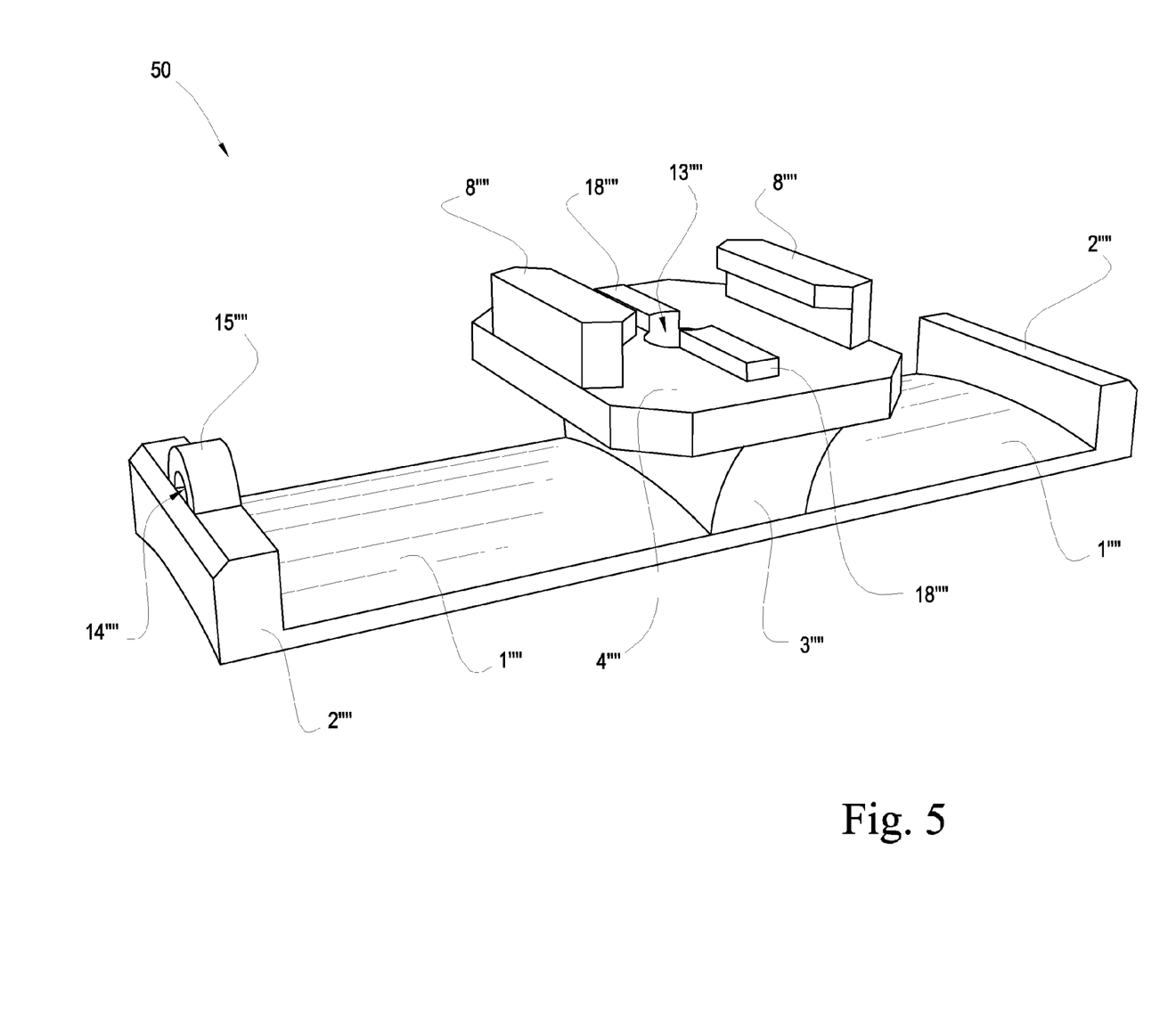
FIG. 5 is a perspective view of a camera mount according to another embodiment of the present invention.

Referring now to FIG. 5, another embodiment of the camera mount 50 according to the present invention is now discussed in greater detail. The camera mount 50 is similar to the camera mount 40 as illustrated in FIG. 4. The embodiment of the camera mount 50 illustrated in FIG. 5 includes the pair of opposing mounting walls 8'''' extending upwardly from the platform 4'''' and a pair of connector members 18'''' that may lay parallel (or substantially parallel) to the pair of mounting walls 8''''. The pair of opposing mounting walls 8'''' may be substantially similar to the pair of opposing mounting walls 8''' as described in the camera mount 40. The pair of connector members 18'''' may be positioned generally in the center of the platform 4''''. The passageway 13'''' may be positioned between the pair of connector members 18'''' in the medial portion of the platform base. The passageway 13'''' may be used to allow for enhanced connection of a post mounted to a camera to the camera mount 50. More specifically, the passageway 13'''' may be adapted to receive a post so that the camera 50 may be used without the need for a slidable engaging member connected to the camera to engage the pair of mounting walls 8'''' and the pair of connector members 18''''. For example and without limitation, the passageway 13'''' may be threaded.

The camera mount 50 may further include the intermediate member 3''''. The intermediate member 3'''' may extend upwardly from the base 1''''. The platform 4'''' may be connected to the intermediate member 3'''' and the intermediate member may be connected to the base 1''''. The platform 4'''', therefore, may be elevated from the base 1''''. More specifically, the intermediate member 3'''' may be detachably connected to the base 1''''.

Those skilled in the art will appreciate that the platform 4'''', the platform base, the intermediate member 3'''', the pair of opposing mounting walls 8'''', and the pair of connector members 18'''', or any combination thereof, may be integrally formed as a monolithic unit. Those skilled in the art will appreciate that the connector member 17''' may include the pair of connector members 18'''' and that each of the embodiments of the camera mount 40, 50 may include the connector member 17''' or the pair of connector members 18''''. The elements of the camera mount 50 according to this embodiment of the invention that are not specifically described herein are similar to those of the camera mount 40 according to the above-referenced embodiment of the present invention, are labeled with quadruple prime notation, and require no further discussion herein.

Although not illustrated, those skilled in the art will appreciate that an adaptor may be used to connect a camera to the platform 4, 4', 4'', 4''', 4''''. As will be discussed in greater detail below, the adaptor may be used to connect the platform 4, 4', 4'', 4''', 4'''', the openings 7, 7', the pair of opposing mounting walls 8''', the second platform 9', the aperture 11', the passageway 13'''', the second opening 16'', the connector member 17''' and/or the pair of connector members 18''''. Those skilled in the art will appreciate that the adapter may be used to facilitate a slidable connection or a mechanical connection, i.e., use of a pin, bolt, screw, or other types of connectors as may be understood by those skilled in the art. Those skilled in the art may appreciate that any number of adapters or different adapters may be used to accommodate connecting any type of camera to the camera mount 10, 20, 30, 40, 50.

Each of the embodiments of the camera mount 10, 20, 30, 40, 50 described herein may include a base 1, 1', 1'', 1''', 1'''' that may be adapted to be connected to a portion of footwear, such as a ski boot, a snow board shoe, a motorcycle boot, a foot, a prosthetic limb or any other implementation of foot wear. Those skilled in the art will further appreciate that all of the elements and any other elements of the camera mount 10, 20, 30, 40, 50 may be integrally formed as a monolithic unit and may also be separately formed and connected to one another by any known means.

The term "camera" when used herein includes, but is not limited to, a still camera, a video camera, a camcorder, a cellular phone, and/or any other device that photographs, video records, and/or audio records. Additionally, the "term" camera may include a device within a case or casing, thereby encompassing both the actual device and the case or casing. The terms "opposing mounting walls," "projecting walls," and "opposing projecting walls" or other similar terms are used interchangeably and refer to the same element or elements. The terms "rectangular section" and "connector member" or other similar terms are used interchangeably and refer to the same element or elements.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of this disclosure.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A camera mount comprising:
   a base having a bottom portion and a top portion;
   a pair of opposing sidewalls connected to and extending upwardly from the base; and
   a platform attached to the base and comprising:
      a platform base,
      a connector member connected to and extending upwardly from a medial portion of the platform base, and
      a pair of opposing mounting walls connected to and extending upwardly from side portions of the platform base;
   wherein the base is adapted to be connected to a portion of footwear;
   wherein the platform is adapted to slidably engage a portion of a camera to retain the camera therein;
   wherein the connector member comprises a pair of connector members; and
   wherein a threaded passageway is formed in the medial portion of the platform base between the pair of connector members.

2. The camera mount according to claim 1 wherein the bottom portion of the base is at least one of curved, substantially curved, flat, and substantially flat and wherein the top portion of the base is at least one of curved, substantially curved, flat, and substantially flat.

3. The camera mount according to claim 1 wherein the platform has a length that is longer than a width of the base.

4. The camera mount according to claim 1 wherein each of the opposing mounting walls is defined by a vertically extending wall that extends upwardly from the platform base and a generally horizontally extending wall that extends inwardly from a top portion of the vertically extending wall.

5. The camera mount according to claim 1 wherein the pair of opposing mounting walls and the connector member extend generally parallel to one another.

6. The camera mount according to claim 1 further comprising an intermediate member extending upwardly from the base; and wherein the platform is connected to the intermediate member so that the platform is elevated from the base.

7. The camera mount according to claim 6 wherein the intermediate member is detachably connected to the base.

8. The camera mount according to claim 1 wherein the platform base, the connector member and the pair of opposing mounting walls are integrally formed as a monolithic unit.

9. The camera mount according to claim 1 further comprising a locking member formed on at least one of the opposing sidewalls; and wherein the locking member has a substantially arcuate shape extending upwardly from an upper portion of the at least one opposing sidewall and a locking member opening formed through a medial portion thereof.

10. The camera mount according to claim 1 wherein the base comprises a flexible material.

11. The camera mount according to claim 1 wherein the base is extendable and collapsible in a longitudinal direction.

12. A camera mount comprising:
   a base having a bottom portion and a top portion;
   a pair of opposing sidewalls connected to and extending upwardly from the base;
   an intermediate member extending upwardly from the base;
   a platform connected to the intermediate member so that the platform is elevated from the base, the platform comprising:
      a platform base,
      a pair of connector members connected to and extending upwardly from a medial portion of the platform base, and
      a pair of opposing mounting walls connected to and extending upwardly from side portions of the platform base,
      wherein a passageway is formed in the medial portion of the platform base between the pair of connector members, and
      wherein the passageway is threaded; and
   wherein the base is adapted to be connected to a portion of footwear.

13. The camera mount according to claim 12 wherein the bottom portion of the base is at least one of curved, substantially curved, flat, and substantially flat and wherein the top portion of the base is at least one of curved, substantially curved, flat, and substantially flat.

14. The camera mount according to claim 12 wherein each of the opposing mounting walls is defined by a vertically extending wall that extends upwardly from the platform base and a generally horizontally extending wall that extends inwardly from a top portion of the vertically extending wall.

15. The camera mount according to claim 12 wherein the pair of opposing mounting walls and the pair of connector members extend generally parallel to one another.

16. The camera mount according to claim 12 wherein the platform base, the pair of connector members and the pair of opposing mounting walls are integrally formed as a monolithic unit.

17. A camera mount comprising:
a base having a bottom portion that is curved and a top portion that is curved, the bottom portion and the top portion having substantially similar curvatures;
a pair of opposing sidewalls connected to and extending upwardly from the base, each of the pair of opposing sidewalls having a bottom portion that is curved and an upper portion that is flat;
a platform connected to the base and having a length that is longer than a width of the base and comprising:
a platform base,
a connector member connected to and extending upwardly from a medial portion of the platform base, the connector member having a substantially rectangular shape, and
a pair of opposing mounting walls connected to and extending upwardly from side portions of the platform base and defined by a vertically extending wall that extends upwardly from the platform base and a generally horizontally extending wall that extends inwardly from a top portion of the vertically extending wall,
wherein the connector member and the pair of opposing mounting walls extend generally parallel to one another; and
wherein the base is adapted to be connected to a portion of footwear.

18. The camera mount according to claim 17 wherein the platform base, the connector member and the pair of opposing mounting walls are integrally formed as a monolithic unit.

19. The camera mount according to claim 17 wherein the base comprises a flexible material; and wherein the base is extendable and collapsible in a longitudinal direction.

* * * * *